(12) United States Patent
Wetzel

(10) Patent No.: US 8,429,827 B1
(45) Date of Patent: Apr. 30, 2013

(54) ELECTRONIC COOKING UTENSIL FOR SETTING COOKING TIME WITH COOKING STATUS INDICATOR

(76) Inventor: Fred Wetzel, Roswell, GA (US)

( * ) Notice: Subject to any disclaimer, the term of this patent is extended or adjusted under 35 U.S.C. 154(b) by 1183 days.

(21) Appl. No.: 12/326,787

(22) Filed: Dec. 2, 2008

(51) Int. Cl.
*A47J 43/28* (2006.01)
(52) U.S. Cl.
USPC ............... 30/322; 30/142; 99/342; 294/55.5; 374/155
(58) Field of Classification Search .............. 30/123, 30/322; 99/342; 374/155
See application file for complete search history.

(56) References Cited

U.S. PATENT DOCUMENTS

| | | | |
|---|---|---|---|
| 3,552,210 A * | 1/1971 | Wright, Jr. ................. | 374/155 |
| 4,207,673 A | 6/1980 | DiGirolamo | |
| 4,914,819 A | 4/1990 | Ash | |
| 5,421,089 A | 6/1995 | Dubas | |
| 5,749,286 A * | 5/1998 | Payette ..................... | 99/413 |
| 5,983,783 A | 11/1999 | Archard | |
| 6,412,398 B1 | 7/2002 | Norcross | |
| 6,591,739 B2 * | 7/2003 | Norcross .................. | 99/342 |
| 6,675,483 B2 | 1/2004 | Bond | |
| 7,104,682 B2 * | 9/2006 | Harris et al. ............. | 374/155 |
| 2006/0196057 A1 * | 9/2006 | So ........................... | 30/322 |
| 2012/0000374 A1 * | 1/2012 | Bock ........................ | 99/413 |

FOREIGN PATENT DOCUMENTS

| | | |
|---|---|---|
| DE | 3119798 | 12/1982 |
| DE | 297 07 926 | * 8/1997 |
| DE | 19706953 | 4/1998 |
| DE | 102005021157 | 11/2006 |
| FR | 2584914 | 1/1987 |

* cited by examiner

*Primary Examiner* — Hwei C Payer
(74) *Attorney, Agent, or Firm* — Michael I. Kroll

(57) ABSTRACT

A battery powered microprocessor-controlled fondue fork has a thermal sensor, a timer, a color LED display for indicating degree of doneness, and a control switch for selecting a predefined cooking time. When the fondue fork is placed into a heated liquid for cooking, the thermal sensor activates the microprocessor-controlled timer which then illuminates the LED display. The LED displays flashing green to indicate the food is cooking, yellow to indicate the food is cooked rare, steady green to indicate the food is cooked medium, red to indicate the food is well-done, and flashing red to indicate an overdone stage of cooking.

22 Claims, 9 Drawing Sheets

COOK TIME CHART

Figure 1:
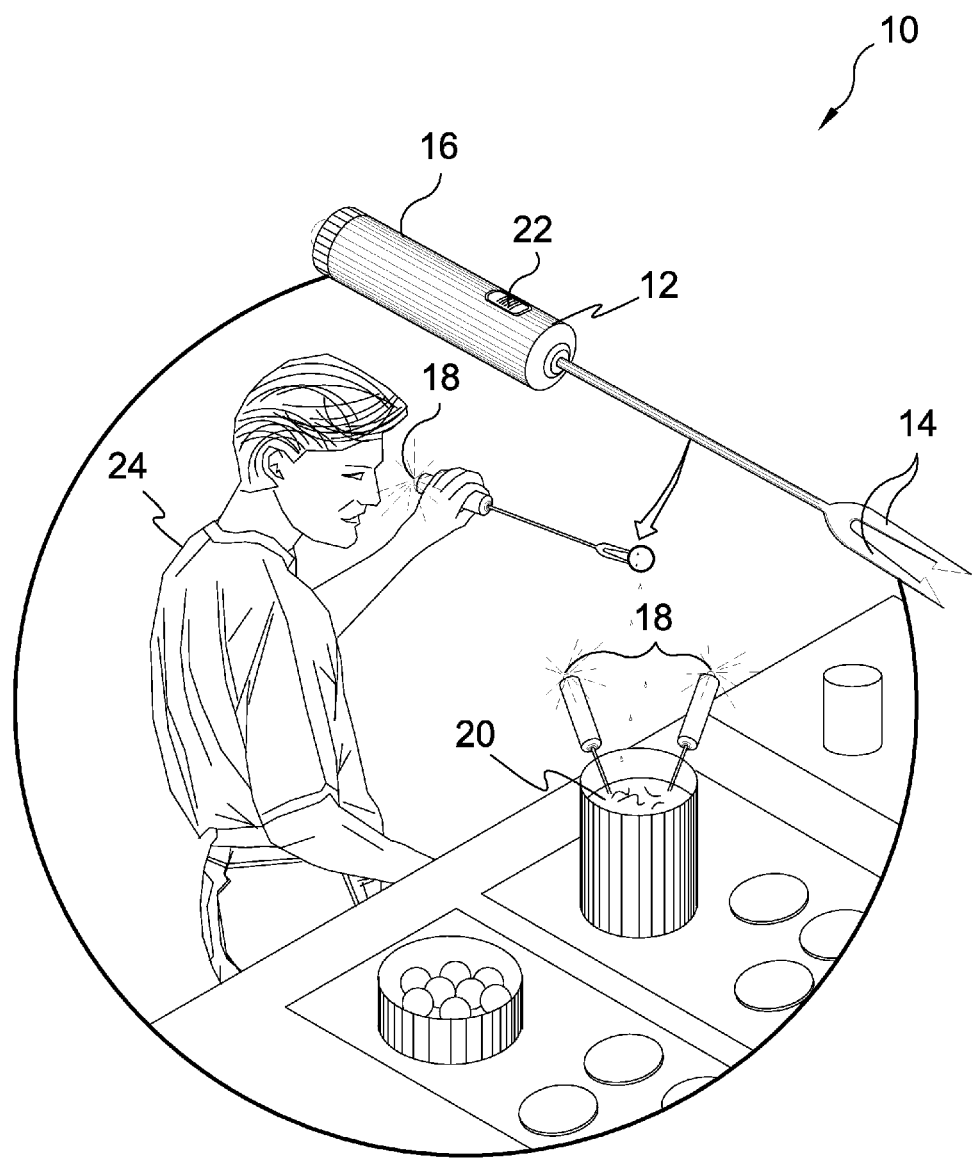

| | FOOD TYPE | NOMINAL TIME | YELLOW | GREEN | RED | FLASH RED |
|---|---|---|---|---|---|---|
| COOK TIME NO. 1 | BEEF | 30 | 15-25 | 25-35 | 35-45 | >45 |
| COOK TIME NO. 2 | FISH, PORK, LAMB | 60 | 45-55 | 55-65 | 65-75 | >75 |
| COOK TIME NO. 3 | POULTRY | 120 | 90-110 | 110-130 | 130-150 | >150 |
| COOK TIME NO. 4 | SEAFOOD | 180 | 90-110 | 170-190 | 190-210 | >210 |
| COOK TIME NO. 5 | VEGETABLES | 240 | 180-220 | 220-260 | 260-300 | >300 |

FIG. 7

ELECTRONIC COOKING UTENSIL FOR SETTING COOKING TIME WITH COOKING STATUS INDICATOR

BACKGROUND OF THE INVENTION

1. Field of the Invention

The present invention relates generally to utensils and more particularly to a utensil that has thermal heat sensing, predefined cook times and lets the user know where the food is in the cook cycle by varying an LED color display.

There are two basic types of fondue, dipping and cooking. Cheese and chocolate fondues are examples of dipping fondues. The food can be bread, fruit, cake and the like, which is dipped in the heated cheese or chocolate and then immediately taken out of the fondue pot for consumption. Since the food is not being cooked with this type of fondue, the amount of time the food is in the fondue pot is not critical.

Cooking fondue can be done in broth or oil and in this type of fondue the food actually has to be cooked so the amount of time the food is in the pot is critical. The fondue fork of the present invention provides a means to achieve optimal fondue cooking times (rare, medium, well done) for a variety of foods with minimal effort.

The user can select from predetermined cook times that are suited for various categories of food. The timer is started when the fondue is placed into the fondue pot and the heat is sensed. The progress of the predefined cook times is displayed via an LED sequence that lets the user know when the food is cooking (flashing green), when it has reached rare stage (constant yellow), when it is perfectly cooked (constant green), when it is well done (constant red) and when it has passed well done (flashing red). The LED sequence allows the user to conveniently see at what stage of cooking the food is at all time. This allows the user to choose how he wants to cook each piece of fondue. Typically each fondue user at the table will have about three to four sticks going at a time.

In short, a fondue is a communal dish shared at the table in an earthenware pot over a small burner. A cheese or cream mix in the pot is kept warm as a semi-liquid sauce into which diners use forks to dip bits of food, most often bread but also a variety of foods such as poultry, beef or other meats that require precise cooking time.

The fondue fork of the present invention provides means to achieve optimal fondue cooking times for a variety of foods and foods sizes. This is achieved by incorporating a timer that activates a visual alarm when the predetermined cook time is met. The length of cook time is manually set by the user of each utensil. Furthermore, the length of cook time is automatically maintained for the next piece of fondue, or if necessary, can be adjusted by the user. The precise cook time is achieved by a thermal sensor incorporated within the utensil. Once the fondue fork is dropped into the fondue, the thermal sensor activates the timer.

The order of operation for utilizing the fondue fork of the present invention is as follows:

User turns on fondue utensil by pressing on/off button;
User attaches food product to end of utensil;
User sets appropriate cook time by pressing timer button a desired amount of times;
Fondue utensil responds with a flashing yellow light indicating the cook time setting and ready for use mode;
User places the utensil into the fondue pot;
Utensil thermal sensor detects heat and activates the timer;
LED on utensil turns to flashing green;
Food product cooks and LED changes to identify progress;
From flashing green to constant yellow—Rare;
From constant yellow to constant green—Medium;
From constant green to constant red—Well-done;
From constant red to flashing red—Past Well-done;
Food product preparation is complete;
Utensil is removed from fondue pot;
Thermal sensor detects removal from heat and resets timer;
LED on utensil turns back to flashing yellow;
Repeat for additional food product, or turn utensil off with switch; and
Thermal sensor automatically turns utensil timer off when heat is not sensed for a predetermined period of time.

2. Description of the Prior Art

There are other thermal sensing and time activated utensils. Typical of these is U.S. Pat. No. 4,207,673 issued to DiGirolamo on Jun. 17, 1980.

Another patent was issued to Ash on Apr. 10, 1990 as U.S. Pat. No. 4,914,819. Yet another U.S. Pat. No. 5,421,089 was issued to Dubus on Jun. 6, 1995 and still yet another was issued on Nov. 16, 1999 to Archard as U.S. Pat. No. 5,983,783.

Another patent was issued to Norcross on Jul. 2, 2002 as U.S. Pat. No. 6,412,398. Yet another U.S. Pat. No. 6,675,483 was issued to Bond on Jan. 13, 2004.

Internationally, a patent was issued to Staeding on Dec. 12, 1982 as German Patent No. DE3119798 and yet another was issued on Jan. 23, 1987 to Roux as French Patent No. FR2584914. Another German Patent No. DE19706953 was issued on Apr. 30, 1998 to Tils and still yet another patent application was published to Schwarz on Nov. 9, 2006 as German Publication No. DE102005021157.

U.S. Pat. No. 4,207,673

Inventor: DiGirolamo

Issued: Jun. 17, 1980

An implement for assisting people in developing better eating habits comprising an instrumentality such as a fork, knife or spoon detachably attached to a hollow handle and wherein there are window openings at the top side of the handle, diodes of two different colors visible at the windows and circuitry including a battery and an on/off switch for causing the diodes to be alternately turned on and off at predetermined intervals.

U.S. Pat. No. 4,914,819

Inventor: Ash

Issued: Apr. 10, 1990

A dietary control eating utensil is disclosed for indicating when food can be eaten therewith. The handle of the utensil includes a gravity-powered timing device. The device includes an elongated transparent material chamber for containing immiscible fluids having different densities such as air and mineral oil. The lighter density fluid forms a visible signal within the chamber that is moveable between the distal and proximal ends. The period associated with the movement of the visible signal depends on the different elevations of the chamber ends. The shape of the chamber along with the density of the two fluids also contributes to the time period the visible signal takes to move between the two ends of the chamber. When the air bubble moves to a predetermined position within the chamber, this indicates when the utensil may be used for consuming food.

U.S. Pat. No. 5,421,089

Inventor: Dubas

Issued: Jun. 6, 1995

A fork with timer comprising a fork having a head, a plurality of spaced tines extended from the head, and a handle extended from the head remote from the tines; timer circuitry connected to the handle of the fork and adapted for providing a cue after an elapsed period of time for indicating to user that another bite of food using the fork may be taken; a replaceable power source connected to the fork and coupled to the timer circuitry with the power source adapted for energizing the timer circuitry; and a switch connected to the fork and coupled between the power source and the timer circuitry with the switch having one orientation for energizing the timer circuitry and another orientation for de-energizing the timer circuitry.

U.S. Pat. No. 5,983,783

Inventor: Archard

Issued: Nov. 16, 1999

An electronic chefs fork is provided which displays indicia such as food type and degree of doneness for a selected food type and temperature and which includes control areas by which the user of the electronic chefs fork selects the meat type. The operational circuitry of the device allows the user to select among an array of food type options and to thereby designate a degree of doneness for the selected type of food. A prompt message is provided to indicate the degree of doneness attained for the selected food type when the device is inserted into the food.

U.S. Pat. No. 6,412,398

Inventor: Norcross

Issued: Jul. 2, 2002

A temperature sensing utensil including a handle and a detachable head. The handle includes an engagement region, having an engagement member moveable between locking and release orientations, and a temperature indicating display assembly. The detachable head includes a receiving region having a receiving member and temperature sensing circuitry. The receiving region releasably receives the engagement region such that positioning of the engagement member in a locking orientation relative to the receiving member locks the detachable head onto the handle, while creating an electrical connection between the temperature sensing circuitry and the temperature indicating display circuitry. However, positioning of the engagement member in a release orientation permits detachment of the head from the handle, and disconnection of the electrical circuit. The temperature sensing utensil may take the form of a fork, spoon, probe or other utensil.

U.S. Pat. No. 6,675,483

Inventor: Bond

Issued: Jan. 33, 2004

A simple, effective, lightweight, durable, combination tool having removably attachable interchangeable implements, which are interchangeable one with the other. The combination tool has locking means, which releasably locks the removably attachable interchangeable implements into a handle. The handle can have a light for illuminating an area or work surface, and the food being cooked and/or barbecued. The handle can have a timer capable of being set to at least one time duration, and audibly alerting a user at the end of a selected one of such time durations, as to how long the food has been cooked or barbecued.

Germany Patent Number DE3119798

Inventor: Staeding

Issued: Dec. 16, 1982

The fondue fork is also designed as a cooking spoon or similar cooking utensil and serves to cook pieces of meat and also to stir or mix. The free end of the handle is provided with a timer for setting the cooking or stirring time. The time unit may be set by means of a ratchet wheel and the function operated by means of a push button. The timer is removably attached to a mounting which has clamps to allow it to be affixed to the fork or cooking spoon handle in a removable manner. The trigger button of each timer has a different colour for each of its various users. The timer switches off automatically once the set time has elapsed and indicates this by a warning light signal.

France Patent Number FR2584914

Inventor: Roux

Issued: Jan. 23, 1987

Method of determining the time needed for cooking all meats, poultry and fish in the oven and device for implementing this method. The present invention relates to a method for determining the time needed for cooking all meats, poultry and fish in the oven and to the device for implementing the said method. The method according to the present invention is essentially characterised in that it consists in carrying out, on the piece to be cooked, at least one measurement of the thickness representative of the said piece, then in determining as a function of this or these measurements and of the nature of the piece, the time needed for cooking the said piece at a determined and known temperature.

Germany Patent Number DE19706953

Inventor: Tils

Issued: Apr. 30, 1998

The stirring spoon head is provided with a heater for heating the stirred food. The heater is located inside the spoon head and can be formed as an infrared radiator. The heating power is adjustable by two switches which can be thermostatically controlled. A timer can be used to control the heater. The control part can have an indicator for the temperature and heat output etc.

Germany Publication Number DE102005021157

Inventor: Schwarz

Published: Nov. 11, 2006

The knife, fork or spoon is fitted with an electrical or mechanical system which produces vibrations for a fixed time. This ensures that a diner chews his food a healthy number of times.

While these utensil devices and systems may be suitable for the purposes for which they were designed, they would not be as suitable for the purposes of the present invention, as hereinafter described.

SUMMARY OF THE PRESENT INVENTION

A primary object of the present invention is to provide means to achieve optimal fondue cooking times for a variety of foods and food sizes.

Another object of the present invention is to provide a cooking utensil incorporating a timer that activates a visual alarm when the predetermined cook time is met.

Yet another object of the present invention is to provide a cooking utensil incorporating a thermal sensor that activates a timer when heat is sensed.

Still yet another object of the present invention is to provide a cooking utensil designed for cooking foods in fondue pots or other devices that require multiple preparation or application.

Another object of the present invention is to provide a cooking utensil designed to allow the user to define the cook time to suit individual food products.

Yet another object of the present invention is to provide a cooking utensil designed to provide visual alert on the progress of food cooking.

Still yet another object of the present invention is to provide a cooking utensil designed to automatically reset its timer for future use upon completion of food preparation.

Yet another object of the present invention is to provide a cooking utensil designed to automatically shut itself off when not utilized over a set period of time.

Additional objects of the present invention will appear as the description proceeds.

The present invention overcomes the shortcomings of the prior art by providing a cooking utensil that achieves optimal fondue cooking times for a variety of foods and foods sizes and which is achieved by incorporating a timer that activates a visual alarm when the predetermined cook time is met, and whereby the length of cook time is manually set by the user of each utensil. Furthermore, the present invention overcomes the shortcomings of the prior art by providing a cooking utensil that maintains preset cook times automatically for the next piece of food, or if necessary, can be adjusted by the user.

The foregoing and other objects and advantages will appear from the description to follow. In the description reference is made to the accompanying drawing figures, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
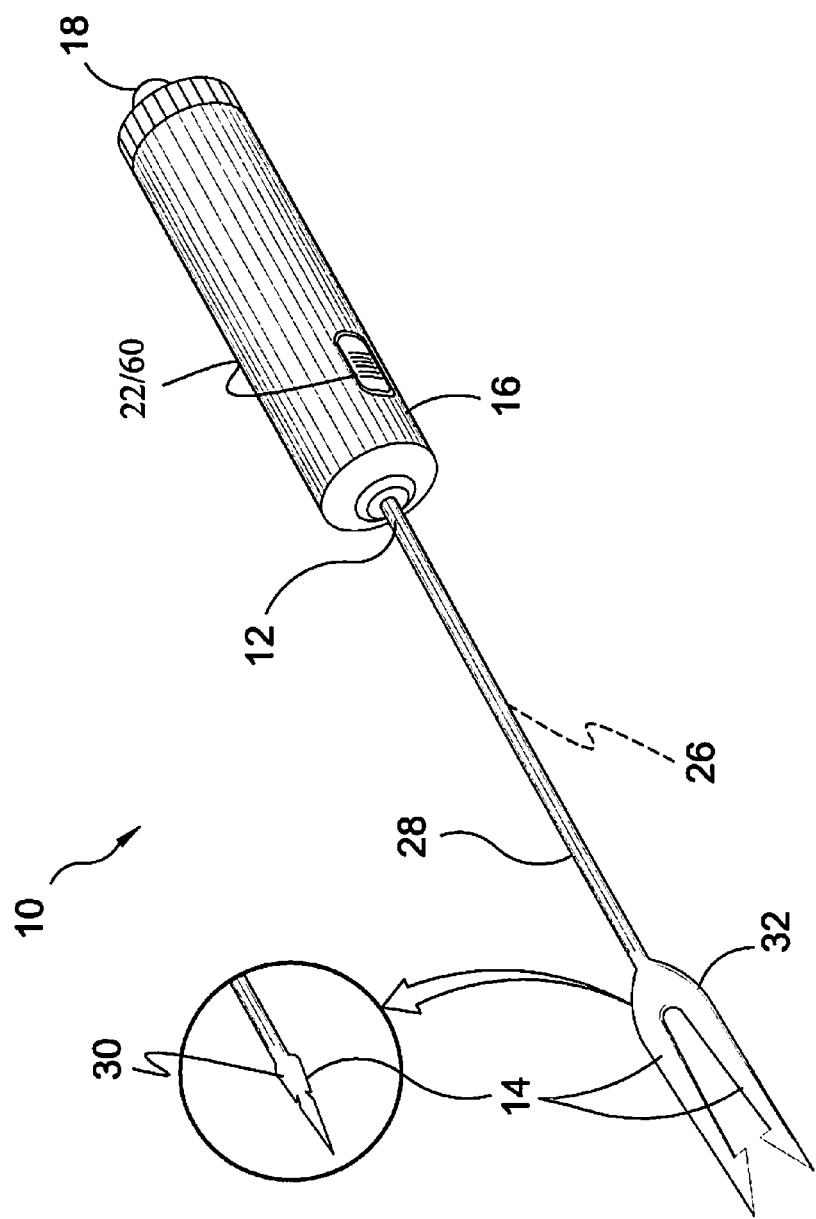
Figure 3:
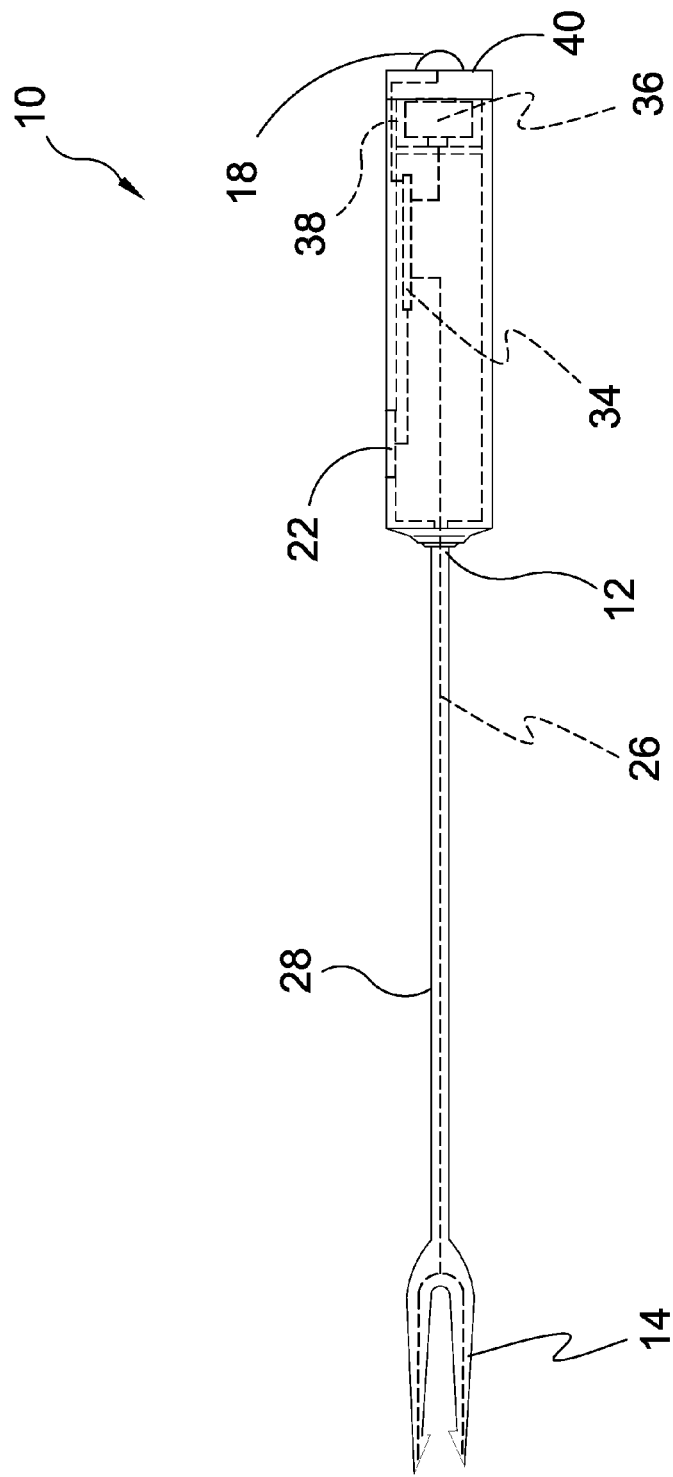
Figure 4:
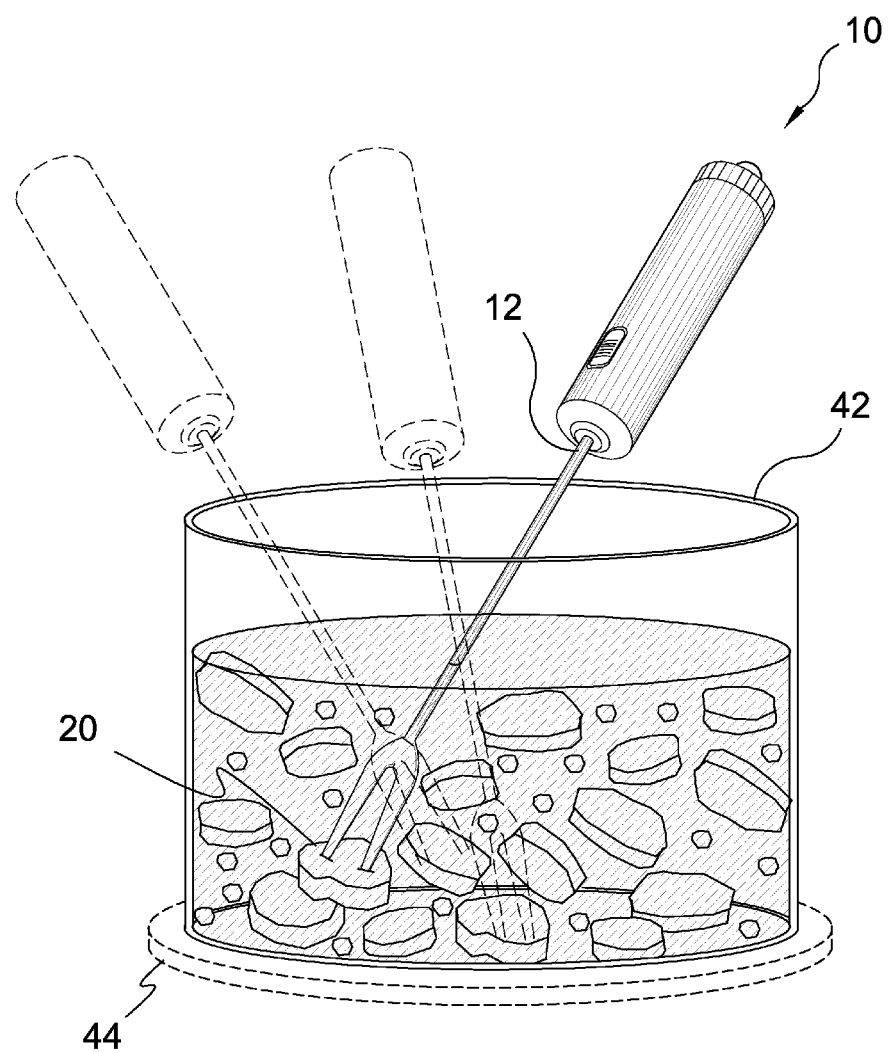
Figure 5:
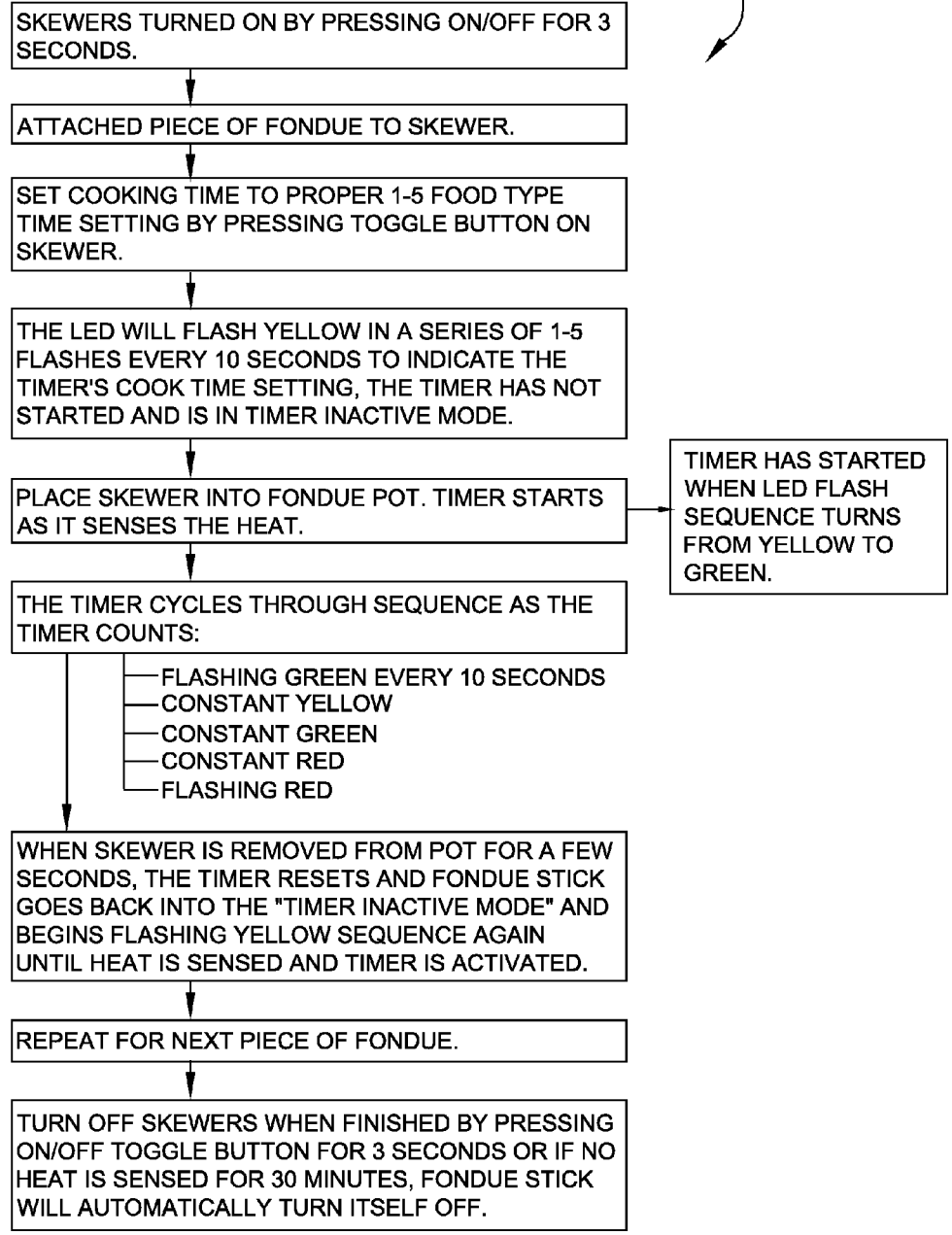
Figure 6:
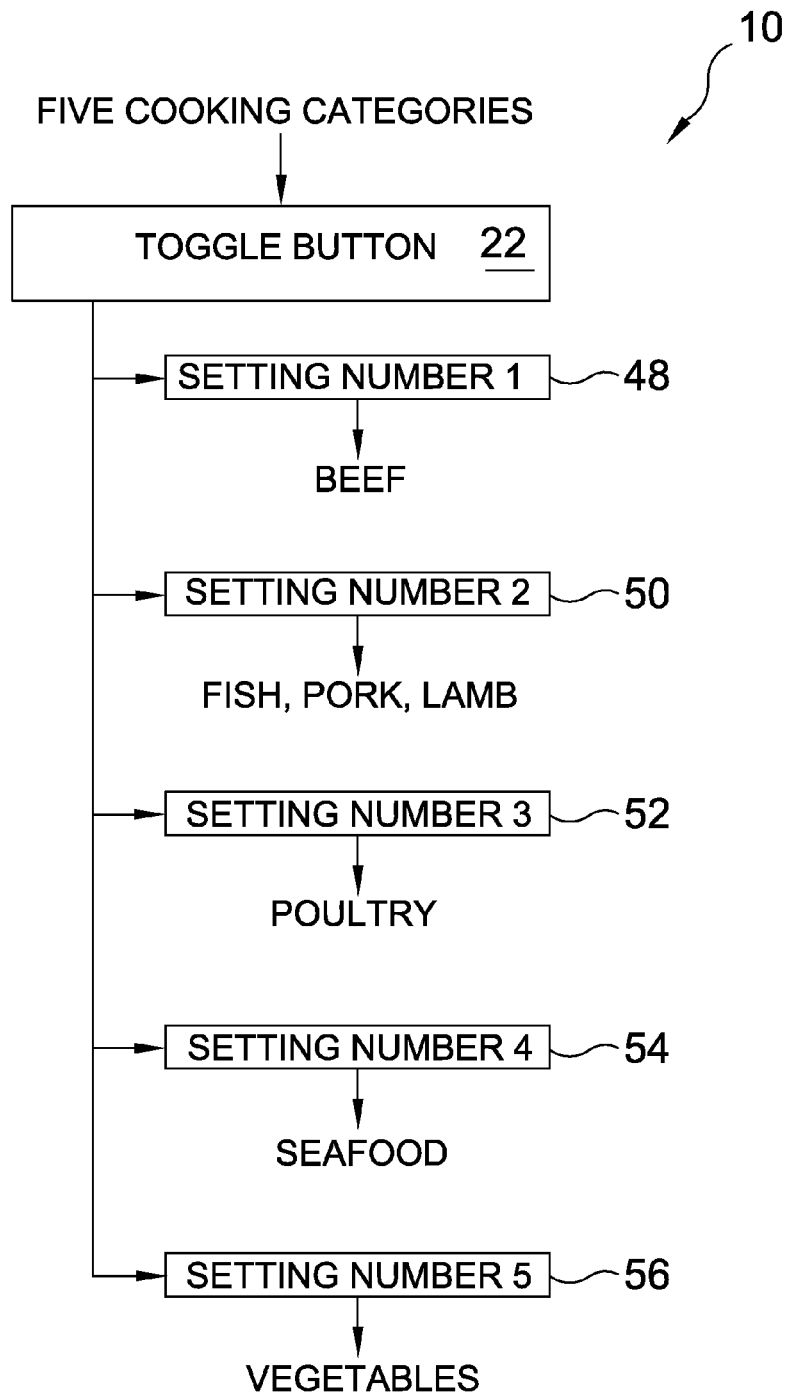
Figure 8:
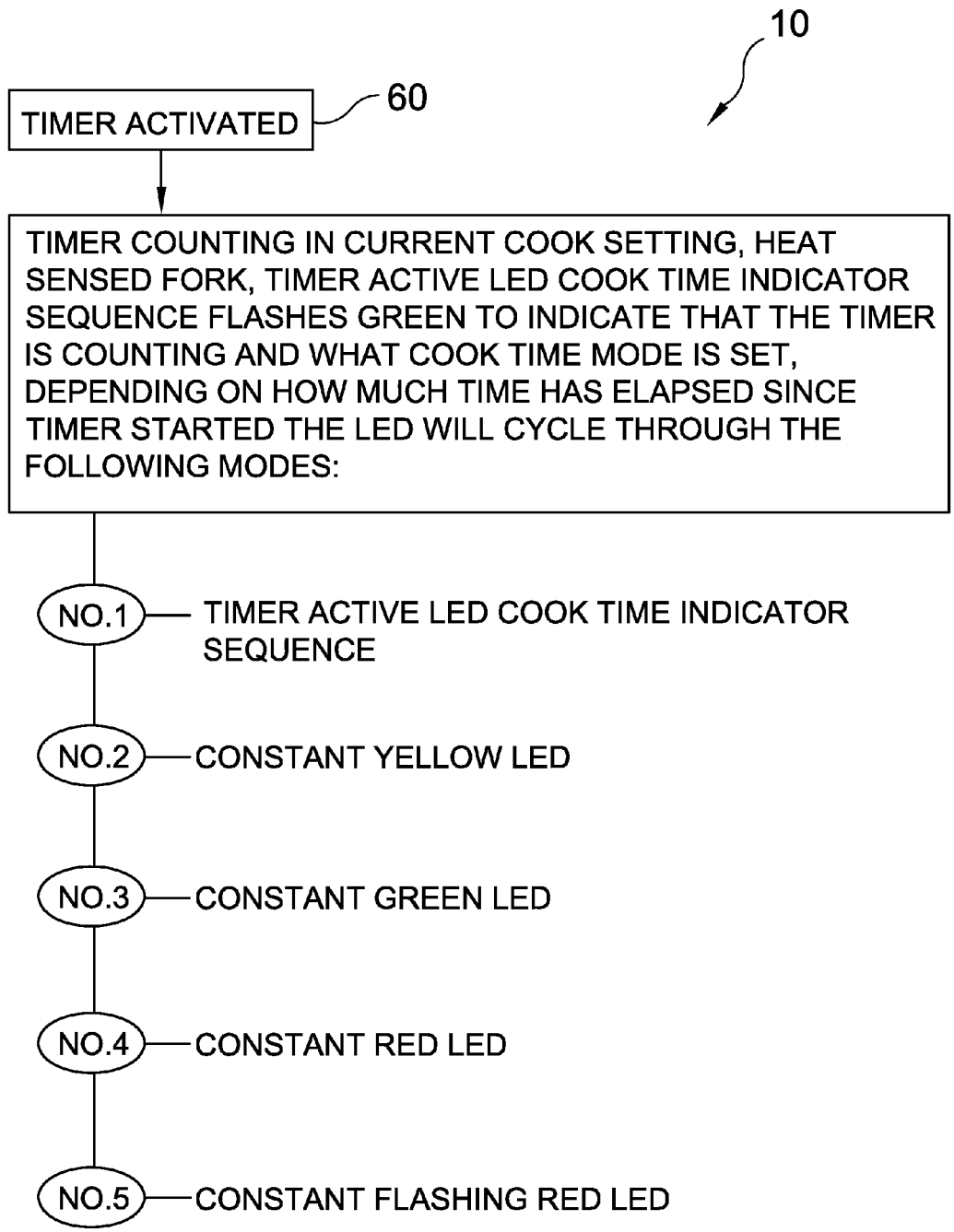
Figure 9:
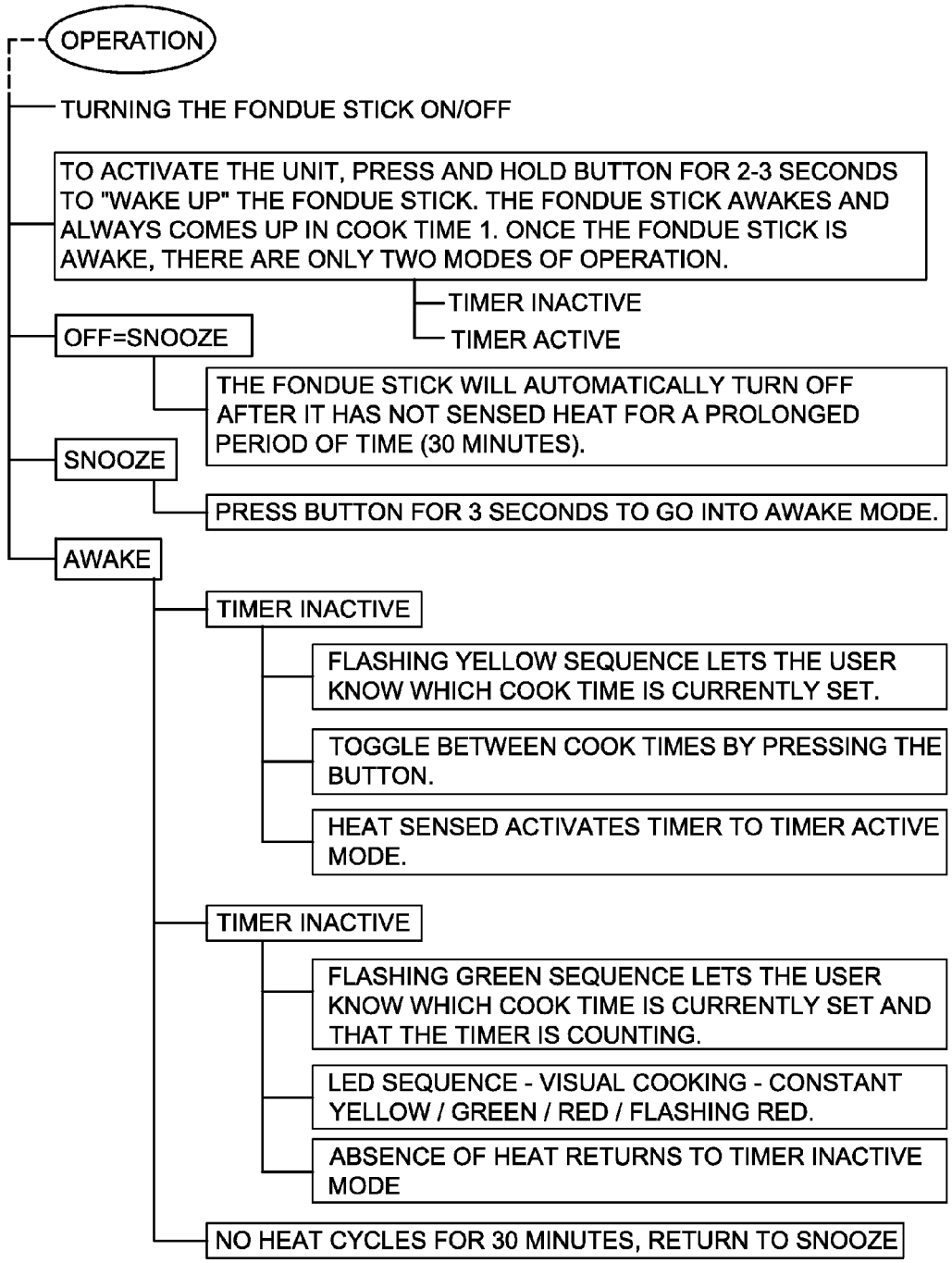

In order that the invention may be more fully understood, it will now be described, by way of example, with reference to the accompanying drawing figures in which:

FIG. 1 is an illustrative view of the present invention in use.
FIG. 2 is a perspective view of the present invention.
FIG. 3 is a sectional view of the present invention.
FIG. 4 is an illustrative view of the present invention in use.
FIG. 5 is a flow chart of operation of the present invention.
FIG. 6 is a chart of the five cooking settings of the present invention.
FIG. 7 is a chart of the five cooking settings of the present invention.
FIG. 8 is a chart of timer activate of the present invention.
FIG. 9 is an operational chart of the present invention.

DESCRIPTION OF THE REFERENCED NUMERALS

Turning now descriptively to the drawings, in which similar reference characters denote similar elements throughout the several views, the figures illustrate the Electronic Cooking Utensil For Setting Cooking Time With Status Indicator of the present invention. With regard to the reference numerals used, the following numbering is used throughout the various drawing figures.

10 Electronic Cooking Utensil For Setting Cooking Time With Status Indicator of the present invention
12 fondue fork/stick
14 tine/skewer of 12
16 handle of 12
18 LED
20 food/fondue
22 manual user control
24 user
26 thermal sensor element
28 shaft of 12
30 single tine version of 12
32 double tine version of 12
34 microprocessor
36 battery
38 battery compartment
40 battery compartment cover
42 fondue pot
44 heat source for 42
46 method of operation of 12
48 first setting of 10
50 second setting of 10
52 third setting of 10
54 fourth setting of 10
56 fifth setting of 10
58 cooktime chart
60 timer

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is an electronic thermal-sensing cooking utensil 10 preferably a tined 14 fondue fork 12 having a single, multi-colored LED 18 placed at or near the tip of the handle 16 that is used to visually display the cooking status of a predefined food 20, by progressively indicating the level the food 20 is cooked by turning from initially displaying a dim to brightening yellow color, then to green, then to steady red that then progressively flashes as the food 20 passes well done. A manual toggle control 22 is also provided that allows the user 24 to toggle between cooking times for different foods. A battery powered microprocessor controls five modes of cooking in conjunction with the LED by sensing heat to start the timer, reset the timer and turn itself off when not used for a set time.

FIG. 2 is a perspective view of the present invention 10. Shown is the a fondue stick 12 having a single, multi-colored LED 18 that visually displays the cooking by turning the LED 18 from displaying a dim to brightening yellow color, then to green, then to steady red that then progressively flashes when well done. A manual user control button 22 is provided, allowing the user to toggle between cooking times. A battery powered microprocessor is also housed within the handle 16 and controls five modes of cooking in conjunction with the LED 18, by measuring heat with a thermal sensor element 26 conducted through the tines 14 and shaft 28 of the fork 12 to start the timer, reset the timer and turn itself off after a predetermined amount of idle time. The fondue fork 12 comprises at least one tine 14 and is depicted here as having a one tine version 30 and a two tine version 32.

FIG. 3 is a sectional view of the present invention 10. Shown is the fork 12 with a thermal sensor element 26 disposed within the tines 14, the shaft 28, the handle 16 and terminating at a microprocessor 34 in circuit communication with the user control 22, the LED 18 and the battery 36 that is removably retained in a battery compartment 38 by a battery cover 40.

FIG. 4 is an illustrative view of the present invention 10 in use. Shown is a fondue pot 42 having a heat source 44 melting and cooking a plurality of pieces of food 20 contained therein. At least one fondue fork 12 is disposed within the food 20 to measure and indicate the cooking status thereof.

FIG. 5 is a flow chart of operation 46 of the present invention 10. Shown are the sequential steps of the method of operation 46 of the thermal sensing cooking utensil of the present invention 10 when used with a fondue pot during the preparation of fondue.

FIG. 6 is a chart of the five cooking settings of the thermal sensing cooking utensil of the present invention 10. The user control 22 is shown as a toggle button having a first setting 48 for beef, a second setting 50 for fish, lamb and pork, a third setting 52 for poultry, a fourth setting 54 for seafood and a fifth setting 56 for vegetables.

FIG. 7 is a chart of the five cooking settings of the present invention 10. Shown is the cook time chart 58 depicting the five cooking settings and their related food types, nominal cooking times and associated LED color indicators.

FIG. 8 is a chart of timer activate of the present invention 10. Shown is a chart of timer 60 settings of the present invention, a fondue stick having a single, multi-colored LED that visually displays the cooking by turning the LED from displaying a dim to brightening yellow color, then to green, then to steady red that then progressively flashes when well done. A control button is provided, allowing the user to toggle between cooking times. A battery powered microprocessor is also housed within the handle and controls five modes of cooking in conjunction with the LED, by sensing heat conducted through the fork to start the timer, reset the timer and turn itself off after a predetermined amount of idle time.

FIG. 9 is a method of operation chart 46 of the present invention 10 during general usage. The present invention 10 is a fondue stick having a single, multi-colored LED that visually displays the cooking by turning the LED from yellow to green to red to flashing red. A toggle button is provided, allowing the user to toggle between cooking times. A battery powered microprocessor controls five modes of cooking in conjunction with the LED by sensing heat to start the timer, reset the timer and turn itself off.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A cooking utensil comprising:
   a) a fondue fork having a handle portion;
   b) a fork portion extending from said handle portion;
   c) a power source comprising a battery in said handle portion;
   d) a thermal sensor for detecting when said fork portion is heated or cooled;
   e) a microprocessor in said handle portion, said microprocessor powered by said power source and in circuit communication with said thermal sensor;
   f) a timer controlled by said microprocessor and being started when said thermal sensor detects a predetermined amount of heat entering said fork portion;
   g) a color LED display controlled by said timer and powered by said power source; and
   h) a manually operable control in said handle portion for selecting one of a plurality of predefined cooking times.

2. A cooking utensil according to claim 1, wherein said timer is turned off when said thermal sensor detects said fork portion losing heat.

3. A cooking utensil according to claim 2, wherein said color LED display comprises yellow, green and red displays.

4. A cooking utensil according to claim 3, wherein said color LED display comprises a single multi-colored LED.

5. A cooking utensil according to claim 4, wherein said timer cycles said single multi-colored LED sequentially through the colors flashing green, yellow, steady green and red.

6. A cooking utensil according to claim 5, wherein said timer, when started by said thermal sensor upon detection of fork heating, signals said LED to display flashing green, indicating a cooking phase.

7. A cooking utensil according to claim 6, wherein said timer signals said LED to cycle from flashing green to yellow after a predetermined, user-selected period of time, with yellow indicating a rare stage of cooking.

8. A cooking utensil according to claim 7, wherein said timer signals said LED to illuminate dim yellow when initially cycled from flashing green to yellow.

9. A cooking utensil according to claim 8, wherein said timer signals said LED to progressively brighten from dim yellow to bright yellow as cooking progresses.

10. A cooking utensil according to claim 7, wherein said timer signals said LED to cycle from yellow to steady green after a predetermined, user-selected period of time, with steady green indicating a medium stage of cooking.

11. A cooking utensil according to claim 10, wherein said timer signals said LED to cycle from steady green to red after a predetermined, user-selected period of time, with red indicating a well-done stage of cooking.

12. A cooking utensil according to claim 11, wherein said timer signals said LED to cycle from red to flashing red after a predetermined, user-selected period of time, with flashing red indicating an overdone stage of cooking.

13. A cooking utensil according to claim 12, wherein said user-selected predetermined cooking time is maintained between uses unless reset by the user.

14. A cooking utensil according to claim 13, further comprising an on/off switch.

15. A cooking utensil according to claim 14, wherein said timer signals said LED to flash yellow upon being switched on, indicating said utensil is ready for use.

16. A cooking utensil according to claim 13, wherein said microprocessor turns said LED off after a predetermined period of nonuse.

17. A cooking utensil according to claim 16, wherein said microprocessor turns said LED on upon detection of heat from said thermal sensor.

18. A method of cooking food in a heated liquid comprising the steps:
a) providing a cooking utensil comprising a fondue fork having a handle portion, a fork portion extending from said handle portion, a battery in said handle portion, a thermal sensor for detecting when said fork portion is heated or cooled, a microprocessor in said handle portion, said microprocessor powered by said battery and in circuit communication with said thermal sensor, a timer controlled by said microprocessor, a color LED display controlled by said timer and powered by said battery, an on/off button, and a manually operable control in said handle portion for selecting one of a plurality of predefined cooking times;
b) turning said cooking utensil on with said on/off button;
c) attaching a piece of food to said fork portion of said utensil;
d) selecting one of said plurality of predefined cooking times with said manually operable control;
e) placing said fork portion, with said piece of food attached thereto, into a heated liquid for cooking, and starting said timer when said thermal sensor detects a predetermined amount of heat entering said fork portion;
f) removing said fork portion, with said piece of food attached thereto, from said heated liquid when said LED display indicates said food is cooked to a user's desired degree of doneness.

19. A method of cooking food in a heated liquid according to claim 18, wherein said timer is turned off when said thermal sensor detects said fork portion losing heat.

20. A method of cooking food in a heated liquid according to claim 19, wherein said color LED display comprises a single multi-colored LED capable of illuminating yellow, green and red.

21. A method of cooking food in a heated liquid according to claim 20, wherein said timer cycles said single multi-colored LED sequentially through the colors flashing green, yellow, steady green and red, said timer, when started by said thermal sensor upon detection of fork heating, signaling said LED to display flashing green, indicating a cooking phase, said timer signaling said LED to cycle from flashing green to yellow after a predetermined, user-selected period of time, with yellow indicating a rare stage of cooking, said timer signaling said LED to cycle from yellow to steady green after a predetermined, user-selected period of time, with steady green indicating a medium stage of cooking, said timer signaling said LED to cycle from steady green to red after a predetermined, user-selected period of time, with red indicating a well-done stage of cooking, and said timer signaling said LED to cycle from red to flashing red after a predetermined, user-selected period of time, with flashing red indicating an overdone stage of cooking.

22. A method of cooking food in a heated liquid according to claim 21, wherein each said predetermined, user-selected period of time is maintained between uses unless reset by the user.

\* \* \* \* \*